US012108209B2

(12) United States Patent
Kobayashi et al.

(10) Patent No.: US 12,108,209 B2
(45) Date of Patent: Oct. 1, 2024

(54) SPEAKER ARRAY

(71) Applicant: NIPPON TELEGRAPH AND TELEPHONE CORPORATION, Tokyo (JP)

(72) Inventors: Kazunori Kobayashi, Tokyo (JP); Masahiro Fukui, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 195 days.

(21) Appl. No.: 17/917,210

(22) PCT Filed: Apr. 9, 2020

(86) PCT No.: PCT/JP2020/015925
§ 371 (c)(1),
(2) Date: Oct. 5, 2022

(87) PCT Pub. No.: WO2021/205591
PCT Pub. Date: Oct. 14, 2021

(65) Prior Publication Data

US 2023/0164483 A1 May 25, 2023

(51) Int. Cl.
*H04R 5/02* (2006.01)
*H04R 1/40* (2006.01)

(52) U.S. Cl.
CPC ............... *H04R 1/403* (2013.01); *H04R 5/02* (2013.01); *H04R 2201/40* (2013.01)

(58) Field of Classification Search
CPC ...... H04R 1/403; H04R 5/02; H04R 2201/40; H04R 2201/401; H04R 2430/20; H04R 3/12
See application file for complete search history.

(56) References Cited

U.S. PATENT DOCUMENTS 8,351,640 B2 * 1/2013 Chang .................... H04R 1/345
381/387
10,535,360 B1 * 1/2020 Ho ...................... G10L 21/0272
(Continued)

FOREIGN PATENT DOCUMENTS

JP 2004172786 A 6/2004
JP 2017523654 A 8/2017

OTHER PUBLICATIONS

Saruwatari et al. (2016) "Advanced Signal Processing No. 5 (10/25)" [online] Accessed on Mar. 27, 2020, website: http://www.sp.ipc.i.u-tokyo.ac.jp/~saruwatari/SP-Grad2016_04.pdf.
(Continued)

*Primary Examiner* — Brian Ensey

(57) ABSTRACT

The speaker array includes a first speaker 1, a second speaker 2, and a local sound emission structure 3. The first transmission portion 311 and the second transmission portion 312 are arranged in such a manner that the distance between the center position of the first transmission portion 311 and the center position of the second transmission portion 312 is smaller than the distance between the center position of the first speaker 1 and the center position of the second speaker 2, in order to generate sound sources that are arranged at an interval narrower than the interval between the first speaker 1 and the second speaker 2.

5 Claims, 9 Drawing Sheets

(56) References Cited

U.S. PATENT DOCUMENTS

| | | | |
|---|---|---|---|
| 2004/0131338 A1 | 7/2004 | Asada et al. | |
| 2017/0085990 A1 * | 3/2017 | Sladeczek | H04S 7/302 |

OTHER PUBLICATIONS

Futoshi Asano (2016) "Chapter 2: Sound Source Separation" The Institute of Electronics, Information and Communication Engineers, Forest of Knowledge, Group 2, part 6, chapter 2 [online] Accessed on Mar. 27, 2020, website:http://www.ieicehbkb.org/files/02/02gun_06hen_02.pdf.

* cited by examiner

SPEAKER ARRAY

CROSS-REFERENCE TO RELATED APPLICATIONS

This application is a U.S. National Stage Application filed under 35 U.S.C. § 371 claiming priority to International Patent Application No. PCT/JP2020/015925, filed on 9 Apr. 2020, the disclosure of which is hereby incorporated herein by reference in its entirety.

TECHNICAL FIELD

The present invention relates to a sound reproduction technique using a speaker.

BACKGROUND ART

In configuring a speaker array using a plurality of speakers, problems relating to speaker reproduction bands and spatial aliasing may occur.

A large speaker is required to reproduce low-frequency sounds. In such a case, as illustrated in FIG. 9, the minimum value of a speaker interval d1 is a speaker diameter d2. Thus, the highest frequency at which spatial aliasing does not occur is limited to a frequency having a wavelength twice the speaker diameter.

Here, spatial aliasing refers to an effect where, in order to satisfy the sampling theorem in a spatial direction, a sound source interval d needs to be equal to or less than a half wavelength of the highest frequency component, and if the sampling theorem is not satisfied, the desired directivity cannot be obtained (see NPL 1 and NPL 2, for example).

CITATION LIST

Non Patent Literature

[NPL 1] Hiroshi Saruwatari, Shoichi Koyama (2016, Oct. 24 (searched on 2020, Mar. 27)). "Advanced Signal Processing No. 5 (10/25)", online. Retrieved from http://www.sp.ipc.i.u-tokyo.ac.jp/~saruwatari/SP-Grad2016_04.pdf

[NPL 2] Futoshi Asano (2016, Oct. 24 (searched on 2020, Mar. 27)). "Chapter 2: Sound Source Separation", online. The Institute of Electronics, Information and Communication Engineers, Forest of Knowledge, Group 2, part 6, chapter 2. Retrieved from http://www.ieice-hbkb.org/files/02/02gun_06hen_02.pdf

SUMMARY OF THE INVENTION

Technical Problem

An object of the present invention is to provide a speaker array capable of eliminating spatial aliasing for high-frequency components that is caused due to speaker size restrictions, to control sound radiation characteristics (directional characteristics) up to high frequencies by using a plurality of speakers.

Means for Solving the Problem

A speaker array according to one aspect of the present invention is a speaker array including a first speaker, a second speaker, and a local sound emission structure, wherein the local sound emission structure is arranged in a direction of directional control with respect to the first speaker and the second speaker and is provided with a first transmission portion for transmitting an acoustic signal radiated from the first speaker, a second transmission portion for transmitting an acoustic signal radiated from the second speaker, and a non-transmission portion for interrupting the transmission of the acoustic signals radiated from the first speaker and the second speaker, the first transmission portion and the second transmission portion being arranged in such a manner that a distance between a center position of the first transmission portion and a center position of the second transmission portion is smaller than a distance between a center position of the first speaker and a center position of the second speaker, in order to generate sound sources that are arranged at an interval narrower than an interval between the first speaker and the second speaker.

A speaker array according to one aspect of the present invention is a speaker array including a plurality of speakers and a local sound emission structure, wherein the local sound emission structure is arranged in a direction of directional control with respect to the plurality of speakers and is provided with a plurality of transmission portions for transmitting acoustic signals radiated from the plurality of speakers, respectively, and a non-transmission portion for interrupting the transmission of the acoustic signals radiated from the plurality of speakers, the plurality of transmission portions being arranged in such a manner that an interval between the plurality of transmission portions is narrower than an interval between the plurality of speakers, in order to generate sound sources that are arranged at an interval narrower than the interval between the plurality of speakers.

Effects of the Invention

By using a local sound emission structure 3 provided with the plurality of transmission portions having an interval D1 narrower than an interval D2 of the plurality of speakers, the speaker interval can be narrowed artificially. This enables control of the radiation characteristics up to high frequencies.

DESCRIPTION OF EMBODIMENTS

Figure 1:
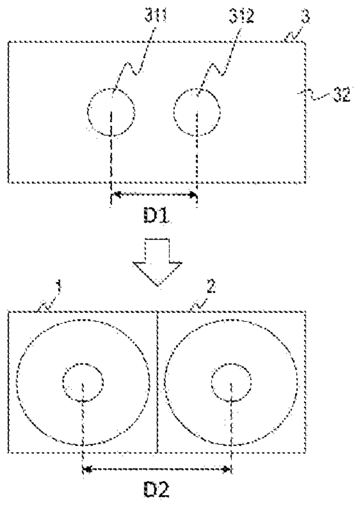
FIG. 1 is a diagram for explaining an example of a first speaker 1, a second speaker 2, and the local sound emission structure 3.

Embodiments of the present invention are now described hereinafter in detail. Note that components with the same function are denoted by the same reference numerals in the diagrams; overlapping explanations are omitted accordingly.

As illustrated in FIG. 1, a speaker array includes a plurality of speakers and the local sound emission structure 3. In the example illustrated in FIG. 1, the plurality of speakers is two speakers (a first speaker 1 and a second speaker 2). Hereinafter, an example in which the plurality of speakers is the first speaker 1 and the second speaker 2 will be described. Also, as will be described hereinafter, the number of the plurality of speakers may be three or more.

FIG. 1 is a diagram for explaining an example of the first speaker 1, the second speaker 2, and the local sound emission structure 3.

Figure 2:
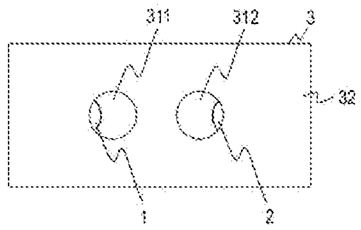
FIG. 2 is an example of a front view of a speaker array in which the local sound emission structure 3 is arranged in front of the first speaker 1 and the second speaker 2.

The local sound emission structure 3 is arranged in a direction of directional control with respect to the first speaker 1 and the second speaker 2. For example, as illustrated in FIG. 2, the local sound emission structure 3 is arranged in front of the first speaker 1 and the second speaker 2. FIG. 2 is an example of a front view of the speaker array in which the local sound emission structure 3 is arranged in front of the first speaker 1 and the second speaker 2.

The material of the local sound emission structure 3 may be any material as long as it can interrupt the transmission of acoustic signals. Examples of the material of the local sound emission structure 3 include plastic, metal, and wood.

The local sound emission structure 3 is provided with a first transmission portion 311 for transmitting an acoustic signal radiated from the first speaker 1, a second transmission portion 312 for transmitting an acoustic signal radiated from the second speaker 2, and a non-transmission portion 32 for interrupting the transmission of the acoustic signals emitted from the first speaker 1 and the second speaker 2.

In the example illustrated in FIG. 1, the first transmission portion 311 and the second transmission portion 312 are in a circular shape. Diameters of the first transmission portion 311 and the second transmission portion 312 is smaller than that of the first speaker 1 and the second speaker 2.

In order to generate sound sources that are arranged at an interval narrower than the interval between the first speaker 1 and the second speaker 2, the first transmission portion 311 and the second transmission portion 312 are arranged in such a manner that a distance D1 between the center position of the first transmission portion 311 and the center position of the second transmission portion 312 is smaller than a distance D2 between the center position of the first speaker 1 and the center position of the second speaker 2.

The acoustic signals radiated from the first speaker 1 and the second speaker 2 are radiated from the first transmission portion 311 and the second transmission portion 312, respectively. Therefore, the center positions as the sound sources are the centers of the holes which are the first transmission portion 311 and the second transmission portion 312.

Since the diameters of the first speaker 1 and the second speaker 2 can be made large enough to reproduce low frequencies, sounds in a low frequency region can be reproduced.

By using the local sound emission structure 3 provided with the plurality of transmission portions having the interval D1 narrower than the interval D2 between the plurality of speakers, the speaker interval can be narrowed artificially. In other words, the interval between the sound sources can be narrowed artificially so as to satisfy the spatial sampling theorem within the used frequency band. This enables control of the radiation characteristics up to high frequencies.

Normally, the diameter of a speaker is the minimum value of a speaker interval, and the center of a spherical wave is the center of the speaker. On the other hand, when the local sound emission structure 3 and the transmission portions are used, the center of the spherical wave becomes the center of the corresponding transmission portion, and the sound sources having an interval narrower than the speaker diameter can be artificially produced.

Figure 3:
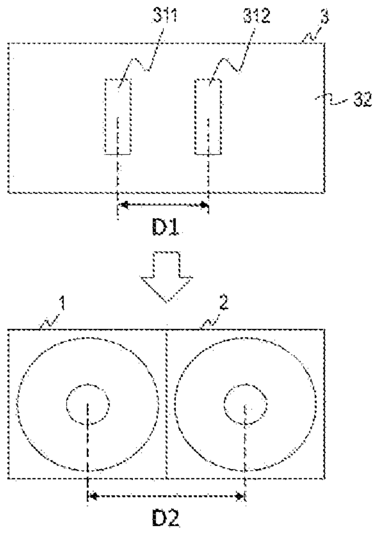
FIG. 3 is a diagram for explaining another example of the shape of transmission portions.
Figure 4:
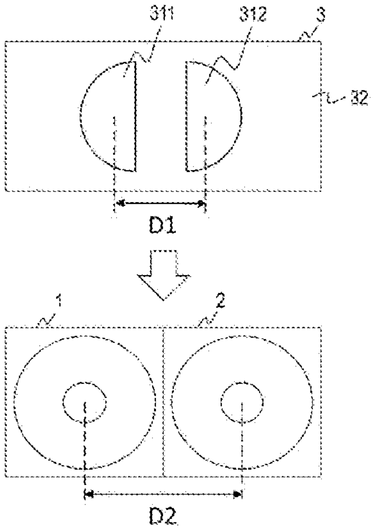
FIG. 4 is a diagram for explaining another example of the shape of transmission portions.

The shape of the first transmission portion 311 and the second transmission portion 312 may not be a circle but may be other shapes such as a semicircle and a rectangle, as illustrated in FIGS. 3 and 4.

The size of the transmission portions such as the first transmission portion 311 and the second transmission portion 312 may be smaller than the diameter of the speakers.

When utilizing acoustic signals that are output from the rear surfaces of the speakers and have a phase opposite to that of acoustic signals output from the front surfaces of the speakers, a sound insulation board may be mounted on the rear surfaces of the speakers so that the sound wave is balanced with the front surfaces.

An example of utilizing acoustic signals having a phase opposite to that of acoustic signals output from the front surfaces is now described below. Acoustic signals having a phase opposite to that of acoustic signals output from the front surfaces of the speakers are emitted from the rear surfaces of the speakers. Normally, a speaker box or the like is installed in order to prevent the emitted sound signals of the opposite phase from diffracting to the front surfaces and canceling the acoustic signals emitted from the front surfaces. However, in some cases, a configuration is employed in which the time lapse from the emission of the sound signals to the diffraction thereof is used to prevent the cancellation of only the acoustic signals very close to the speakers. When the acoustic signals of opposite phase are used in this manner, a sound insulation board or both a sound insulation board and transmission portions may be arranged on the rear surfaces of the speakers, as will be described hereinafter. By such arrangement, the acoustic signals emitted from the rear surfaces of the speakers are configured to diffract so that the acoustic signals that have passed through the transmission portions arranged in front of the speakers are not canceled at a short distance from the transmission portions but are canceled at a distant region.

In other words, the speaker array may further include a reverse local sound emission structure that is arranged in the direction opposite to the direction of directional control with respect to the first speaker 1 and the second speaker 2 (referred to as the rear surfaces, hereinafter). The reverse local sound emission structure is provided with a first rear surface transmission portion for transmitting the acoustic signal radiated from the rear surface of the first speaker 1, a second rear surface transmission portion for transmitting the acoustic signal radiated from the rear surface of the second speaker 2, and a rear surface non-transmission portion for interrupting the transmission of the acoustic signals radiated from the rear surfaces of the first speaker 1 and the second speaker 2. The acoustic signals radiated from the rear surfaces of the first speaker 1 and the second speaker 2 are radiated in the phase opposite to that of the acoustic signals radiated from the front surfaces of said speakers. The first rear surface transmission portion and the second rear surface transmission portion are provided so that, when the acoustic signals that have been radiated from the rear surfaces of the first speaker 1 and the second speaker 2 and passed through the first rear surface transmission portion or the second rear surface transmission portion diffract in the direction of directional control, the acoustic signals radiated in the direction of directional control are not canceled at a desired distance from the speakers.

In addition, for example, at least one of the rear surface tone holes of the speakers may be covered with a sound insulation board.

Figure 5:
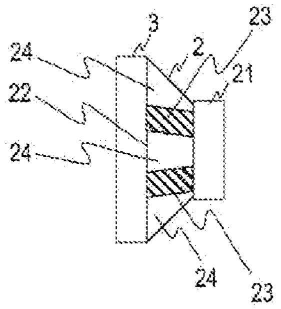
FIG. 5 is a diagram for explaining an example of a rear back hole of a speaker.

As illustrated in FIG. 5, a rear surface tone hole 24 of the speaker 2 is a gap between a plurality of arm portions 23 extending from a center portion 21 of the rear surface of the speaker 2 to an outer peripheral portion 22 of a cone of the speaker 2 in order to support the cone. Note that FIG. 5 does not show any sound insulation board. Although FIG. 5 illustrates an example of rear surface tone hole using the speaker 2, the same applies to a rear surface tone hole of the speaker 1.

The distance between the center position of the transmission portion of the rear surface of the speaker 1 and the center position of the transmission portion of the rear surface of the speaker 2 is preferably equal to the distance between the center position of the first transmission portion and the center position of the second transmission portion in front of the speakers.

When filtering a signal to be input to the speakers using a FIR filter or the like, the positional information of the sound sources used in designing the filter does not employ the center position of each of the plurality of speakers but employs the center position of each of the plurality of transmission portions.

Specifically, a FIR filter design unit 4 may design the FIR filter using the transmission characteristics between the center position of each of the plurality of transmission portions and a listening position and the transmission characteristics between the center position of each of the plurality of transmission portions and a suppression position.

Figure 6:
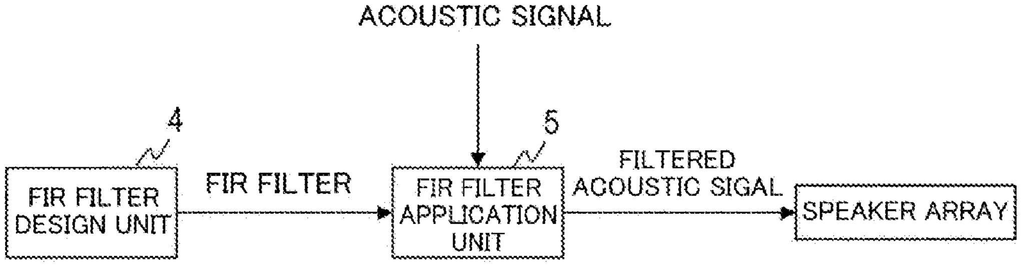
FIG. 6 is a diagram for explaining an example of filtering processing.

In this case, as illustrated in FIG. 6, the FIR filter designed by the FIR filter design unit 4 is input to a FIR filter application unit 5. The FIR filter application unit 5 generates a filtered acoustic signal by applying the input FIR filter to the acoustic signal. The filtered acoustic signal is then applied to the speaker array. Then, the speaker array radiates an acoustic signal based on the filtered acoustic signal.

As described above, the plurality of speakers (e.g., the first speaker 1 and the second speaker 2) may radiate acoustic signals that are filtered by a filter designed based on the acoustic signals transmitted through the transmission portions (e.g., the first transmission portion 311 and the second transmission portion 312).

In addition, when the transmission characteristics used in designing the filter are obtained by actual measurement or simulation, the actual measurement or simulation is performed with the local sound emission structure 3 attached.

Modifications

Although the embodiments of the present invention have been described above, specific configurations of the present invention are not limited thereto, and needless to say, design modifications and the like not departing from the gist of the present invention are also included in the present invention.

For example, in the examples described above, the speaker array is provided with two speakers, but three or more speakers may be provided in the speaker array. That is, the speaker array may be provided with a plurality of speakers.

In this case, the local sound emission structure 3 is arranged in the direction of directional control with respect to the plurality of speakers.

Furthermore, the local sound emission structure is provided with a plurality of transmission portions for transmitting acoustic signals radiated from the plurality of speakers, respectively, and a non-transmission portion for interrupting the transmission of the acoustic signals radiated from the plurality of speakers.

In order to generate sound sources that are arranged at an interval narrower than the interval between the plurality of speakers, the plurality of transmission portions are arranged in such a manner that the interval between the plurality of transmission portions is narrower than the interval between the plurality of speakers.

Figure 7:
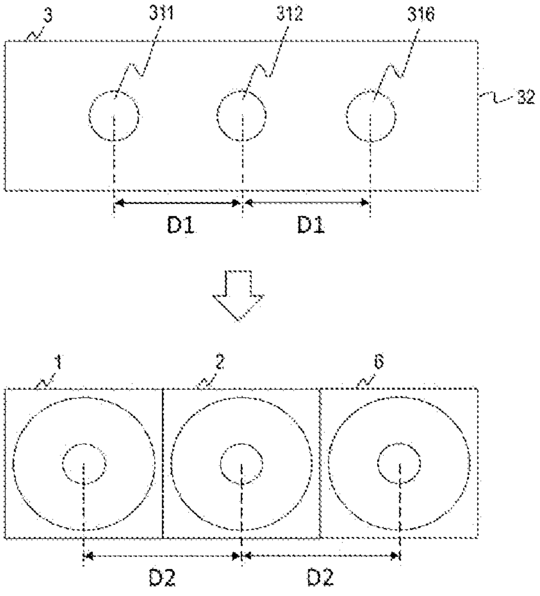
FIG. 7 is a diagram for explaining an example of a speaker array having three speakers.

FIG. 7 illustrates an example of a speaker array with three speakers 1, 2, and 6 arranged linearly, and the local sound emission structure 3. In this case, the local sound emission structure 3 is provided with three transmission portions 311, 312, and 316 for transmitting acoustic signals radiated from the three speakers 1, 2, and 6, respectively. In order to generate sound sources that are arranged at an interval narrower than the interval of the three speakers 1, 2, and 6, the three transmission portions 311, 312, and 316 are arranged in such a manner that the interval D1 of the three transmission portions 311, 312, and 316 is narrower than the interval D2 of the plurality of speakers 1, 2, and 6.

Figure 8:
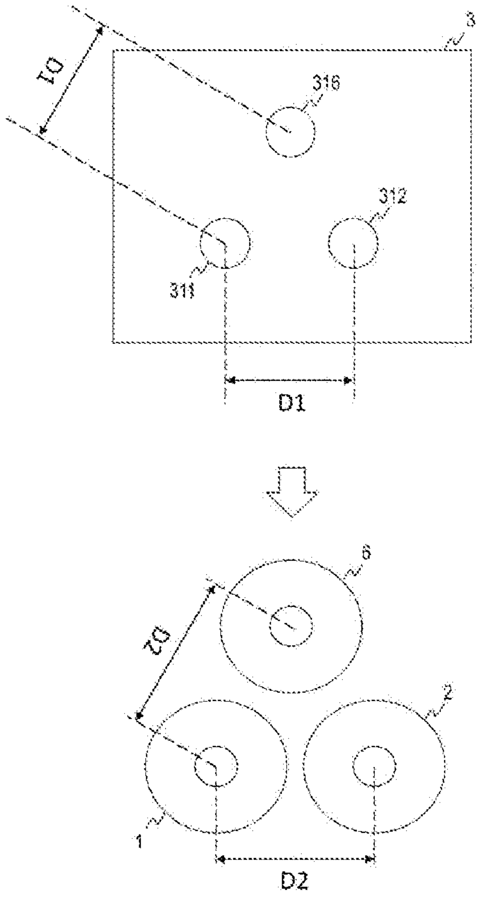
FIG. 8 is a diagram for explaining an example of a speaker array having three speakers.
Figure 9:
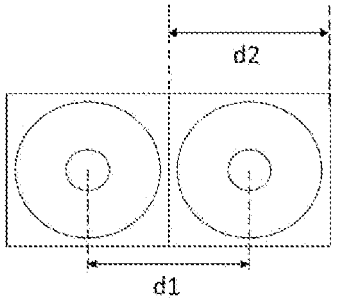
FIG. 9 is a diagram for explaining the prior art.

Note that three or more speakers do not have to be arranged linearly. For example, as illustrated in FIG. 8, three or more speakers may be arranged on a plane. In the example illustrated in FIG. 8, the three speakers 1, 2, and 6 are arranged at the vertices of an equilateral triangle having a side length D2. Thus, the interval of the three speakers 1, 2, and 6 is D2. In this case, the local sound emission structure 3 is provided with the three transmission portions 311, 312, and 316 for transmitting acoustic signals radiated from the three speakers 1, 2, and 6, respectively. The three transmission portions 311, 312, and 316 are arranged at the vertices of an equilateral triangle having a side length D1. Here, D1<D2.

The invention claimed is:

1. A speaker array, comprising:
a first speaker;
a second speaker; and
a local sound emission structure, wherein
the local sound emission structure is arranged in a direction of directional control with respect to the first speaker and the second speaker and is provided with a first transmission portion for transmitting an acoustic signal radiated from the first speaker, a second transmission portion for transmitting an acoustic signal radiated from the second speaker, and a non-transmission portion for interrupting the transmission of the acoustic signals radiated from the first speaker and the second speaker, the first transmission portion and the second transmission portion being arranged in such a manner that a distance between a center position of the first transmission portion and a center position of the second transmission portion is smaller than a distance between a center position of the first speaker and a center position of the second speaker, in order to generate sound sources that are arranged at an interval narrower than an interval between the first speaker and the second speaker, for enabling control of the radiation characteristics up to high frequencies.

2. The speaker array according to claim 1, wherein
the distance between the center position of the first transmission part and the center position of the second transmission part is designed to narrow artificially the interval between the first speaker and the second speaker so as to satisfy the half-wavelength or less of the highest frequency component.

3. The speaker array according to claim 1, wherein the first speaker and the second speaker radiate acoustic signals that are filtered by a filter designed based on the acoustic signals transmitted through the first transmission portion and the second transmission portion.

4. A speaker array, comprising:

a plurality of speakers; and a local sound emission structure, wherein the local sound emission structure is arranged in a direction of directional control with respect to the plurality of speakers and is provided with a plurality of transmission portions for transmitting acoustic signals radiated from the plurality of speakers, respectively, and a non-transmission portion for interrupting the transmission of the acoustic signals radiated from the plurality of speakers, the plurality of transmission portions being arranged in such a manner that an interval between the plurality of transmission portions is narrower than an interval between the plurality of speakers, in order to generate sound sources that are arranged at an interval narrower than the interval between the plurality of speakers.

5. The speaker array according to claim 1, further comprising a reverse local sound emission structure that is arranged in a direction opposite to the direction of directional control with respect to the first speaker and the second speaker (referred to as rear surfaces, hereinafter), wherein the reverse local sound emission structure is provided with a first rear surface transmission portion for transmitting an acoustic signal radiated from a rear surface of the first speaker, a second rear surface transmission portion for transmitting an acoustic signal radiated from a rear surface of the second speaker, and a rear surface non-transmission portion for interrupting the transmission of the acoustic signals radiated from the rear surfaces of the first speaker and the second speaker, and the acoustic signals radiated from the rear surfaces of the first speaker and the second speaker are radiated in a phase opposite to that of acoustic signals radiated from front surfaces of said speakers, the first rear surface transmission portion and the second rear surface transmission portion being provided so that, when the acoustic signals that have been radiated from the rear surfaces of the first speaker and the second speaker and passed through the first rear surface transmission portion or the second rear surface transmission portion diffract in the direction of directional control, the acoustic signals radiated in the direction of directional control are not canceled at a desired distance from the speakers.

* * * * *